United States Patent [19]

Takeuchi et al.

[11] Patent Number: 4,947,296
[45] Date of Patent: Aug. 7, 1990

[54] SUN VISOR FOR AUTOMOTIVE VEHICLE

[75] Inventors: Kazuo Takeuchi, Atsugi; Masamitsu Matsuki, Sagamihara, both of Japan

[73] Assignee: Nissan Motor Co., Ltd., Yokohama, Japan

[21] Appl. No.: 430,141

[22] Filed: Nov. 1, 1989

[30] Foreign Application Priority Data

Nov. 11, 1988 [JP] Japan ............................ 63-147459[U]

[51] Int. Cl.$^5$ ................................................ B60J 3/00
[52] U.S. Cl. .................................... 362/135; 362/144; 296/97.5
[58] Field of Search ................. 362/61, 135, 142, 144; 296/97.1, 97.5, 97.8

[56] References Cited

U.S. PATENT DOCUMENTS

| 4,227,241 | 10/1980 | Marcus | 362/135 |
| 4,421,355 | 12/1983 | Marcus | 362/144 |
| 4,794,497 | 12/1988 | Jönsas et al. | 362/144 |
| 4,803,602 | 2/1989 | Svensson | 362/135 |

FOREIGN PATENT DOCUMENTS 61-117722  7/1986  Japan.

Primary Examiner—Ira S. Lazarus
Assistant Examiner—Richard R. Cole
Attorney, Agent, or Firm—Foley & Lardner, Schwartz, Jeffery, Schwaab, Mack, Blumenthal & Evans

[57] ABSTRACT

To prevent the driver from being dazzled by the light emitted from a lamp unit of a sun visor provided with a vanity mirror. The vanity mirror and the lamp unit are covered by a folding light cover disposed between upper edges of the vanity mirror and the lamp unit and an upper edge of the mirror cover. When the mirror cover is pivoted open, the folding light cover is unfolded perpendicular to the flat surface of the sun visor body to partially cover the vanity mirror and the lamp unit from above and beside. When the mirror cover is pivoted closed, the folding light cover is folded down between the mirror cover and the vanity mirror or the lamp unit.

8 Claims, 2 Drawing Sheets

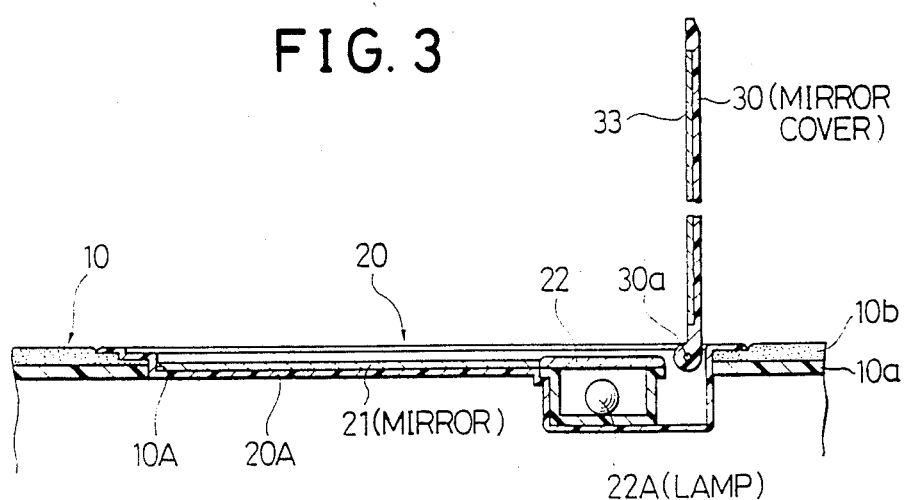

SUN VISOR FOR AUTOMOTIVE VEHICLE

BACKGROUND OF THE INVENTION

1. Field of the Invention

The present invention relates generally to a sun visor for an automotive vehicle, and more specifically to a sun visor provided with a vanity (toilet) mirror.

2. Description of the Prior Art

Various sun visors provided with a vanity mirror for automotive vehicles have been proposed. In particular, Japanese Published Unexamined (Kokai) Utility Model Application No. 61-117722 discloses a sun visor provided with a vanity mirror and a lamp unit, in which the mirror is attached to the back surface of a sun visor body and two lamps are mounted on both the side portions thereof, and further the mirror and the lamp unit are protected by a pivotal mirror cover.

In this prior-art sun visor provided with a vanity mirror, since the lamps are mounted on both the sides of the mirror and therefore the mirror is usable at night under illumination, this sun visor is convenient for the passenger. In this prior-art sun visor, however, when a passenger taking a front seat turns on the lamp unit to use the vanity mirror at night, there exists a problem in that the driver taking a seat next to the passenger is dazzled by the light emitted from the lamp unit mounted on the sun visor.

SUMMARY OF THE INVENTION

With these problems in mind, therefore, it is the primary object of the present invention to provide a sun visor for an automotive vehicle, by which the driver will not be dazzled by the light emitted from the lamp unit mounted on the sun visor, while increasing the quantity of illumination light emitted from the lamp unit to the vanity mirror user.

To achieve the above-mentioned object, the sun visor for an automotive vehicle according to the present invention comprises: (a) a sun visor body (10); (b) a vanity mirror (21) attached to said sun visor body; (c) a lamp unit (22) attached to said sun visor body; (d) a mirror cover (30) pivotally supported on said sun visor body, for covering said vanity mirror and said lamp unit simultaneously when pivoted closed horizontally; and (e) a folding light cover (31) disposed spreading between upper edges of said vanity mirror and said lamp unit and an upper edge of said mirror cover, for covering said vanity mirror and said lamp unit from above when said mirror cover is pivoted open, said folding light cover being folded along at least one folding line when said mirror cover is pivoted closed.

The vanity mirror unit and the lamp unit are arranged side by side with the lamp unit located on the middle side of the passenger compartment. Further, the mirror cover is pivotally supported near the lamp unit.

The folding light cover is of fan-shaped cover, which is foldable along a folding line such as a notch (32A) formed on an inner surface of the folding light cover, a butt joint portion of two divided folding light cover members connected by at least one hinge (32B), an engagement portion of two divided folding light cover member connected by a pivotal pin (32C).

Further, it is preferable to provide a reflecting surface (33) on the inner surface of the mirror cover to effectively reflect light emitted from the lamp unit toward the user. Further, it is preferable to close the pivotal mirror cover by a magnetic force where the folding light cover is folded between the mirror cover and the vanity mirror or the lamp unit.

When the mirror cover is pivoted open horizontally and the lamp unit is turned on at night for use, since the folding light cover is unfolded full open, the vanity mirror and the lamp unit can be covered from above and beside by the light cover and the mirror cover, so that it is possible to prevent a driver near the vanity mirror user from being dazzled by the light emitted by the lamp unit. Further, since a reflecting mirror is provided on the inner surface of the mirror cover, it is possible to increase the quantity of illumination light toward the user when the mirror cover is pivoted open.

BRIEF DESCRIPTION OF THE DRAWINGS

FIG. 2(A) is an enlarged partial cross-sectional view for assistance in explaining a folding notch formed in the folding light cover;

FIG. 2(B) is an enlarged partial cross-sectional view for assistance in explaining a folding hinge attached to the folding light cover;

FIG. 2(C) is an enlarged partial perspective view for assistance in explaining a pivot pin attached to the folding light cover; and FIG. 3 is a partial cross-sectional view taken along the line III—III in FIG. 1.

DETAILED DESCRIPTION OF THE PREFERRED EMBODIMENTS

Figure 1:
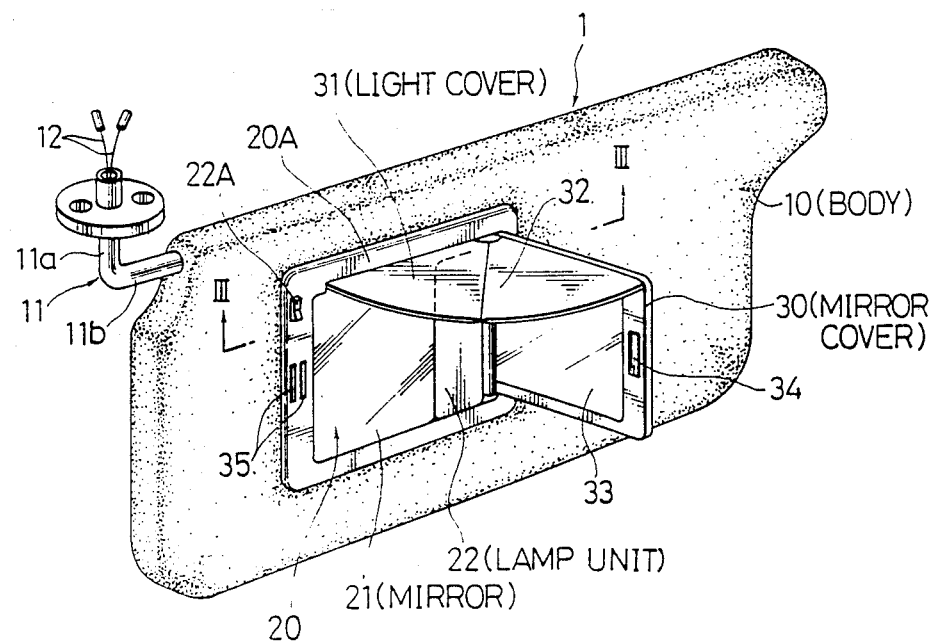
FIG. 1 is a perspective view showing an embodiment of the sun visor for an automotive vehicle according to the present invention.

An embodiment of the present invention will be described hereinbelow with reference to the attached drawings. In FIG. 1, a sun visor 1 of the present invention roughly comprised a sun visor body 10, an illumination mirror unit 20 having a vanity mirror 21, a lamp unit 22, and a mirror cover 30 provided with a fan-shaped folding light cover 31 which can be folded down along a folding line 32.

In more detail, with reference to FIG. 1, the sun visor body 10 is supported by an angled shaft 11 so as to be pivotable in two different directions. That is, when pivoted about a vertical axle 11a of the angled shaft 11, the sun visor 1 is moved from a front position with the sun visor surface placed parallel to a front windshield to a side position with the sun visor surface placed parallel to a side windshield or vice versa; when pivoted about a horizontal axle 11b of the angled shaft 11, the sun visor 1 is moved from an upper unusable position with the sun visor surface placed parallel to the vehicle roof to a lower usable position with the sun visor surface placed parallel to the front windshield or vise versa. Further, two wires 12 are passed through a hollow portion of the angled shaft 11 to supply power from a car battery, for instance to the lamp unit 22.

As shown in FIG. 3, the sun visor body 10 made of a thin resin plate 10a and a thin foamed resin 10b is formed with a square hollow portion 10A at roughly the middle thereof, to which a frame 20A of the illumination mirror unit 20 is fitted.

In the illumination mirror unit 20, the vanity mirror 21 is arranged on the side remote from the driver and the lamp 22 is arranged on the side near the driver or on the middle side of the passenger compartment. The lamp 22 is turned on or off by a switch 22A provided on the frame 20A of the illumination mirror unit 20.

The feature of the present invention is to provide the mirror cover 30 provided with a fan-shaped folding light cover 31 which can be folded down along a folding line 32 when the mirror cover is pivoted closed. The mirror cover 30 is pivotally supported by a support pin 30a (FIG. 3) provided on the frame 20A on the side near the driver or the middle side of the passenger compartment, so as to be pivotally opened or closed from or to the vanity mirror 21 and the lamp unit 22. The mirror cover 30 is formed with a reflecting mirror 33 on the inner surface of the mirror cover 30 to effectively reflect light emitted from the lamp unit 22 toward the passenger's face. Further, an iron plate 34 is attached to the inner surface of the mirror cover 30 so as to be brought into magnetic contact with two spaced magnetic pieces 35 attached to the frame 20A, when the mirror cover 30 is kept closed. The fan-shaped folding light cover 31 made of plastic is disposed spreading between the upper edges of the vanity mirror 21 and the lamp unit 22 and an upper edge of the mirror cover 30 (on the side near the angled shaft 11). Therefore, the light cover 31 is unfolded upward when the mirror cover 30 is pivoted open but folded downward along the folding line 32 when the mirror cover 30 is pivoted closed.

The folding line 32 is a folding notch 32A formed on the inner surface of the folding light cover 31, as shown in FIG. 2(A), for instance. Without being limited thereto, however, it is also possible to provide a thin hinge 32B fixed to a butt joint portion of two divided folding light cover members with rivets as shown in FIG. 2(B), or a small-diameter pivot pin 32C passed through the engagement portion of two divided folding light cover members as shown in FIG. 2(C). Further, it is also possible to form a plurality of folding lines in the folding light cover 31. The size of the folding light cover 30 is so determined that the mirror cover 30 can be open horizontally from the left (remote from the driver) to the right side (near the driver) about 90 degrees from the surface of the sun visor body 10.

In use of the vanity mirror, the sun visor 1 is pivoted from an upper unusable position with the sun visor surface placed parallel to the vehicle roof to a lower usable position with the sun visor surface placed parallel to the front windshield. Under these conditions, the mirror cover 30 of the illumination mirror unit 20 is pivoted open horizontally to expose the vanity mirror 21 and the lamp unit 22, so that the passenger can reflect his or her face in the vanity mirror 21. At night, the illumination switch 22A is turned on to light up the lamp unit 22. Therefore, it is possible to illuminate the passenger's face to more clearly reflect the passenger's face in the mirror. In this case, the light emitted from the lamp unit 22 can be effectively covered by the mirror cover 30 from beside and by the fan-shaped folding light cover 31 from above, it is possible to prevent the driver near the vanity mirror user from being dazzled by the light emitted from the lamp unit 22 and reflected from the walls of the passenger compartment. On the other hand, since the light emitted from the lamp unit 22 is effectively reflected by the reflecting mirror 33 mounted on the inner surface of the mirror cover 30 toward the passenger using the vanity mirror 21, it is possible to increase the quantity of illuminating light directed toward the user.

In the above embodiment, a bulb 22A (a point light source) is used for the lamp unit 22. Without being limited thereto, however, it is of course possible to use a surface light source such as a fluorescent lamp, an electroluminescence sheet element, etc. Further, it is possible to use a brilliant resin sheet as the reflecting mirror 33 mounted on the inner surface of the mirror cover 30. Further, in FIG. 1, although only an upper folding light cover 31 is shown, it is also preferable to attach another lower folding light cover, where necessary. Furthermore, it is also possible to attach a folding light cover to a sun visor to be mounted over the driver.

As described above, in the sun visor for an automotive vehicle according to the present invention, the vanity mirror and lamp unit are arranged side by side, the lamp unit is placed on the driver side (on the middle side of the passenger compartment), and further the mirror cover provided with the fan-shaped folding light cover is pivotally supported further on the driver side. Therefore, even when the illumination mirror unit is open for use and the lamp unit is turned on at night, it is possible to effectively cover the light emitted from the lamp unit, so that the driver can be prevented from being dazzled by the light directly emitted from the lamp unit and indirectly reflected from the roof and walls of the passenger compartment. In addition, since the reflecting mirror is provided on the inner surface of the mirror cover, it is possible to effectively reflect the light emitted from the lamp unit toward the passenger, so that the quantity of illumination for the user can be increased to reflect a more clean image in the vanity mirror.

What is claimed is:

1. A sun visor for an automotive vehicle comprising:
   (a) a sun visor body;
   (b) a vanity mirror attached to said sun visor body;
   (c) a lamp unit attached to said sun visor body;
   (d) a mirror cover pivotally supported on said sun visor body, for covering said vanity mirror and said lamp unit simultaneously when pivoted closed horizontally; and
   (e) a folding light cover disposed spreading between upper edges of said vanity mirror and said lamp unit and an upper edge of said mirror cover, for covering said vanity mirror and said lamp unit from above when said mirror cover is pivoted open, said folding light cover being folded along at least one folding line when said mirror cover is pivoted closed.

2. The sun visor for an automotive vehicle of claim 1, wherein said vanity mirror and said lamp unit are arranged side by side with said lamp unit located on a middle side of a passenger compartment, and further said mirror cover is pivotally supported near said lamp unit.

3. The sun visor for an automotive vehicle of claim 1, wherein said folding light cover is a fan-shaped folding light cover.

4. The sun visor for an automotive vehicle of claim 1, wherein said folding line is a notch formed on an inner surface of said folding light cover.

5. The sun visor for an automotive vehicle of claim 1, wherein said folding line is a butt joint portion of two divided folding light cover members connected by at least one hinge.

6. The sun visor for an automotive vehicle of claim 1, wherein said folding line is an engagement portion of two divided folding light cover member connected by a pivot pin.

7. The sun visor for an automotive vehicle of claim 1, wherein said mirror cover comprises a reflecting surface formed on an inner surface thereof, for reflecting light emitted from said lamp unit toward a user.

8. The sun visor for an automotive vehicle of claim 1, wherein said mirror cover comprises an iron piece brought into magnetic contact with a magnet mounted on said sun visor body when said mirror cover is pivoted closed with said folding light cover folded between said mirror cover and said vanity mirror or said lamp unit.

* * * * *